United States Patent
Schmidt et al.

(10) Patent No.: US 6,249,736 B1
(45) Date of Patent: Jun. 19, 2001

(54) METHOD AND DEVICE FOR CONTROLLING A BRAKING SYSTEM IN OPEN LOOP

(75) Inventors: Günther Schmidt, Tauberbischofsheim; Jürgen Binder, Stuttgart; Hermann Winner, Karlsruhe; Ulrich Gottwick, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/253,602

(22) Filed: Feb. 19, 1999

(30) Foreign Application Priority Data

Feb. 21, 1998 (DE) .............................................. 198 07 366

(51) Int. Cl.⁷ ................................ B60T 13/10; B60T 8/58
(52) U.S. Cl. ................................ 701/70; 701/22; 303/68; 303/191; 303/116.1; 303/122.05; 303/115.2
(58) Field of Search ..................... 701/70, 22; 303/191, 303/152, 186, 14, 119.1, 155; 188/358, 359

(56) References Cited

U.S. PATENT DOCUMENTS

| | | | |
|---|---|---|---|
| 5,588,718 | * 12/1996 | Winner et al. | 303/113.1 |
| 5,779,328 | * 7/1998 | Mergenthaler et al. | 303/122.12 |
| 5,882,091 | * 3/1999 | Toda et al. | 303/113.2 |
| 5,887,957 | * 3/1999 | Buttner et al. | 303/186 |
| 5,938,296 | * 8/1999 | Nakazawa | 303/113.2 |
| 5,951,116 | * 9/1999 | Nagasaka et al. | 303/14 |
| 5,971,500 | * 10/1999 | Voges et al. | 303/113.4 |
| 5,997,106 | * 12/1999 | Takayama | 303/122.05 |
| 6,003,961 | * 12/1999 | Binder et al. | 303/191 |
| 6,007,161 | * 12/1999 | Worsdorfer | 303/115.2 |
| 6,027,182 | * 2/2000 | Nakanishi et al. | 303/116.1 |
| 6,070,954 | * 6/2000 | Urababa et al. | 303/152 |

OTHER PUBLICATIONS

Jonner et al., "Electrohydrau lic Brake System—The First Approach to Brake–By–Wire Technology," SAE (Society of Automotive Engineers) Technical Paper Series, Paper No. 960991, International Congress & Exposition, Detroit, Michigan, Feb. 26–29, 1996, pp. 105–112.

* cited by examiner

*Primary Examiner*—William A. Cuchlinski, Jr.
*Assistant Examiner*—Tuan C To
(74) *Attorney, Agent, or Firm*—Kenyon & Kenyon

(57) ABSTRACT

A method and device for controlling a braking system of a motor vehicle in open loop, in which the wheel-brake pressure in the individual wheel brakes is adjusted via closed pressure-control loops. Different secondary braking operations are initiated depending on the fault condition. The faults are detected on the basis of a model which takes into account the prevailing operating state of the braking system.

23 Claims, 5 Drawing Sheets

METHOD AND DEVICE FOR CONTROLLING A BRAKING SYSTEM IN OPEN LOOP

FIELD OF THE INVENTION

The present invention relates to a method and device for controlling a braking system in open loop.

BACKGROUND INFORMATION

Jonner et al., "Electrohydraulic Brake System—The First Approach to Brake-By-Wire Technology," SAE (Society of Automotive Engineers) Technical Paper Series, Paper No. 960991, 1996, pp. 105–112 describes a conventional method and device for an electrohydraulic braking system. A driver braking input of the electrohydraulic braking system is derived from the actuation of the brake pedal by the driver. This braking input is converted, possibly in view of further operating variables, into setpoint brake pressures for the individual wheel brakes.

The setpoint braking pressures are adjusted for each wheel by closed pressure-control loops on the basis of the predefined setpoint pressure, and of the actual brake pressure measured in the area of the wheel brake. Since the brake pressure in the wheel brakes in such an electrohydraulic braking system is adjusted and modulated by electrical means via valve arrangements, dependent upon the driver's braking input, it is necessary to monitor the correct functioning of the pressure modulation, and suitable measures in case of a fault are necessary to ensure the performance reliability of the braking system.

SUMMARY OF THE INVENTION

An object of the present invention is to provide measures, with whose aid the adjustment of the braking pressure in the wheel brakes can be reliably monitored, and which ensure a secondary braking operation in the case of a fault.

The present invention provides for reliable monitoring of the components regulating the pressure at the individual wheel brakes. It is particularly advantageous that various fault representations can be distinguished, so that in the event of a fault, in each case the suitable secondary braking operation is initiated depending on the fault representation occurring. These measures substantially improve the performance reliability and availability of the braking system.

It is particularly advantageous that the electrical braking control does not have to be switched off in response to every occurring fault, but rather that only partial shut-downs of the electrical system are carried out depending on the fault condition.

BRIEF DESCRIPTION OF THE DRAWINGS

FIG. 4b shows a second portion of the flow chart of FIG. 4a.

DETAILED DESCRIPTION

Figure 1:
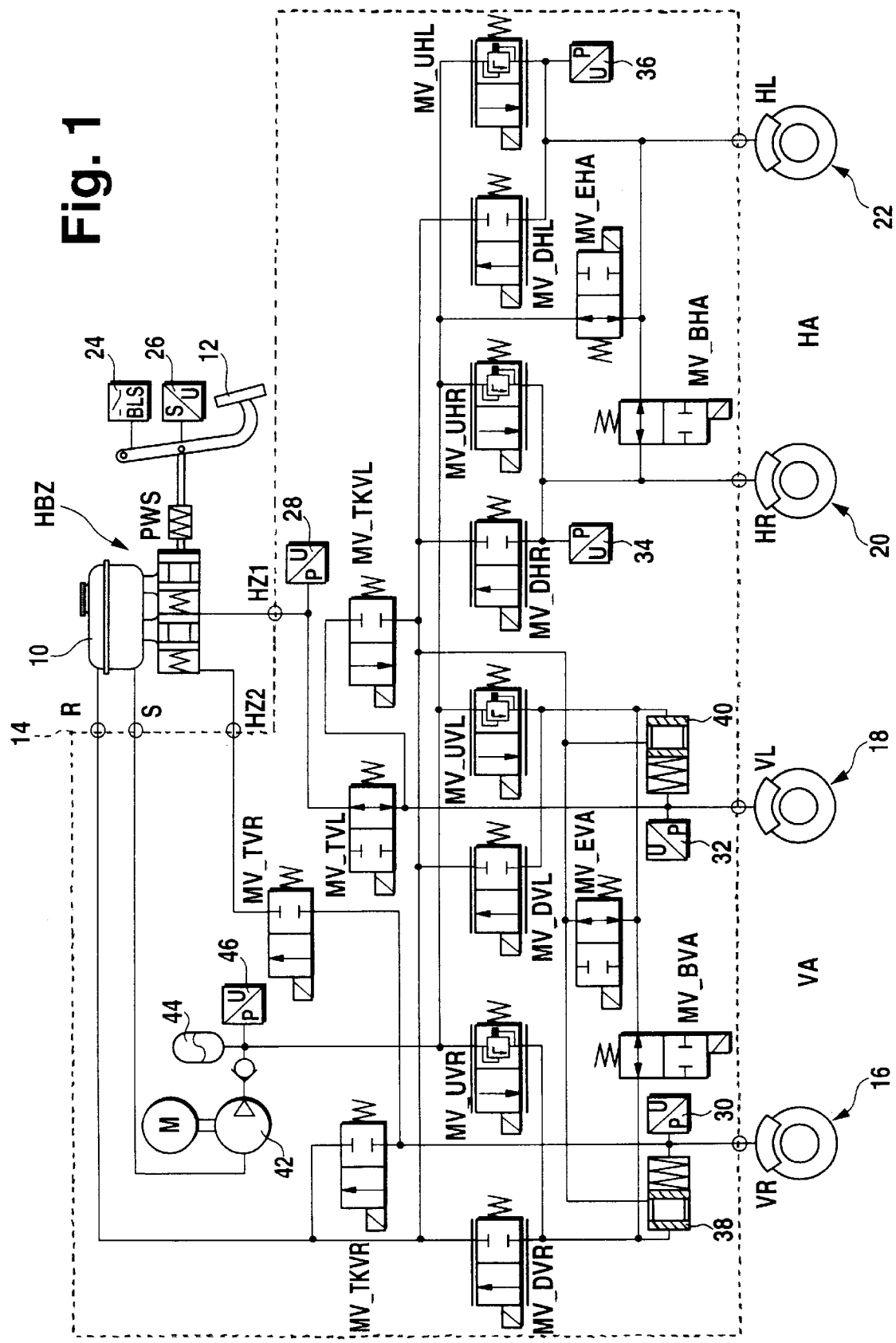
FIG. 1 shows a preferred exemplary embodiment of an electrohydraulic braking system according to the present invention.

FIG. 1 shows a preferred exemplary embodiment of an electrohydraulic braking system. FIG. 1 depicts a master brake cylinder HBZ having a reservoir 10, to which is attached a brake pedal, operable by the driver. In addition, provision is made for a hydraulic aggregate (e.g., a hydraulic modulator) 14 which includes valve and pump arrangements for controlling wheel brakes 16, 18, 20 and 22. Connected to brake pedal 12 is a brake-pedal switch 24 which closes in response to the actuation of the brake pedal, and a measuring device 26 for detecting the deflection of the brake pedal. The brake-pedal switch can be designed as a simple make-contact element, or, to improve the monitoring ability, as a double switch having a break-contact element and a make-contact element. In the same way, measuring device 26 for detecting the deflection of the pedal can be redundantly designed.

In addition, provision is made for a pedal-travel simulator PWS which, in response to actuation of the brake pedal, simulates for the driver a customary feeling of the pedal with respect to counteracting force and pedal deflection. Connected to master brake cylinder HBZ are the two brake circuits HZ1 and HZ2. Inserted in them are a separating valve MV_TVR and MV_TVL, respectively, which, in an electrically controlled braking system, are closed by receiving current. Upstream of the separating valve, in at least one of the brake circuits, a pressure sensor 28 measures the pressure applied by the driver via the brake-pedal actuation. When the separating valves are closed, the master brake cylinder is hydraulically separated from the pressure-regulating system.

One pressure modulator for regulating braking pressure is included for each wheel brake in the pressure-regulating system. Each pressure modulator is composed of one intake valve (MV_UVR, MV_UVL, MV_UHR, MV_UHL), one discharge valve (MV_DVR, MV_DVL, MV_DHR, MV_DHL) and one pressure sensor 30, 32, 34 and 36 which measures the pressure in the line leading to the wheel brake. One media-isolating piston 38 and 40, respectively, is located in the two front-wheel pressure modulators, between the valves (intake and outlet valve) and the pressure sensors or the wheel brake. The pressure modulators are connected via equalizing (i.e., balance) valves MV_BVA and MV_BHA which, in response to receiving current, can be controlled independently of one another.

Also provided for each axle are relief valves MV_EVA and MV_EHA, respectively, which, when not receiving current, permit the reduction in pressure from the wheel pressure modulators of one axle. They connect the pressure modulators of one axle to the feedback lines running to reservoir 10. In the electrically controlled operating state, these two valves are permanently current-receiving, i.e. closed. Provision is furthermore made in each case for a temperature-compensation valve MV_TKVL and MV_TKVR for each front-wheel pressure modulator. These valves are closed, in a state of receiving no current, and are opened, by receiving current, for reducing pressure from the pressure modulator of one front wheel when certain conditions, in particular a very long braking duration, exist. The temperature-compensation valves connect the brake line leading to the wheel brake, with the return line.

The energy for the brake-pressure modulation comes from a single-piston high-pressure pump 42 driven by an electromotor. High-pressure pump 42 is connected to a high-pressure accumulator 44, which is used as an intermediate buffer, and whose pressure is detected by a pressure sensor 46. The pressure line of pump 42 runs to the intake valves of the wheel brakes, while the suction line of pump 42 is connected to reservoir 10. Reference is made to the preferred exemplary embodiment shown in FIG. 1 with regard to particulars of the hydraulic circuitry. However, the procedure of the present invention, described in the following, is advantageously used not only in conjunction with such a hydraulic circuit, but rather everywhere where, in connection with an electrically controlled braking system, the wheel-brake pressure is electrically adjusted by controlling valve arrangements as a function of the driver's braking input.

During normal operation, the braking system described in FIG. 1 functions as follows. The driver steps on the brake pedal. In so doing, the driver feels a counteracting force dependent on the pedal-travel. This travel-dependency is formed by the defined characteristic property of the pedal-travel simulator. In response to sensing a driver's braking input via the pedal-travel sensor, the brake-pedal switch and/or the pressure sensor, separating valves (MV_TVR and MV_TVL) and relief valves (MV_EVA and MV_EHA) are closed. A pressure resulting from the pedal force builds up in master brake cylinder HBZ. The braking input of the driver is calculated from the signals of brake-pedal switch 24, pedal-travel sensor 26 and/or pressure sensor 28 as, e.g., a setpoint deceleration or as a setpoint braking force. The individual setpoint wheel-brake pressures are formed from this braking input. These pressures are modified depending on the driving condition and slippage condition and are adjusted via the wheel pressure modulators due to current flowing through the valves. In the closed control loop, the prevailing pressures at the wheel pressure sensors are retrieved for the setpoint-actual adjustment for each wheel brake. In response to different setpoint pressures in the left and right wheel of an axle, the equalizing valves are closed, and in each wheel brake, the predefined setpoint pressure is adjusted by driving the intake and discharge valves along the lines of a closed-loop control of the actual brake pressure to the setpoint brake pressure.

To build up pressure at a wheel brake, the intake valve is traversed by current to the extent that the desired setpoint pressure develops in the wheel brake, producing the desired dynamic response. Pressure is decreased in a corresponding manner by current flowing through the discharge valve, brake fluid flowing back into the reservoir via the return line. The relief valves come into effect in case of a fault in the system. If, during a braking operation, the electrical system fails, all the valves revert to their state of receiving no current. The relief valves then open the pressure modulators to the return line, so that no braking pressure can be locked in. In the same way, in the quiescent state, these valves permit the compensatory volume flow to the reservoir in response to temperature fluctuations.

Pump 42 is actuated in response to an active braking process and/or, in the event the accumulator pressure in accumulator 44 falls below a predefined value. In addition to this function, ascertained accumulator pressure 46 is also evaluated within the framework of the closed-loop control, since it essentially represents the pressure present at the entry of the intake valves.

Figure 2:
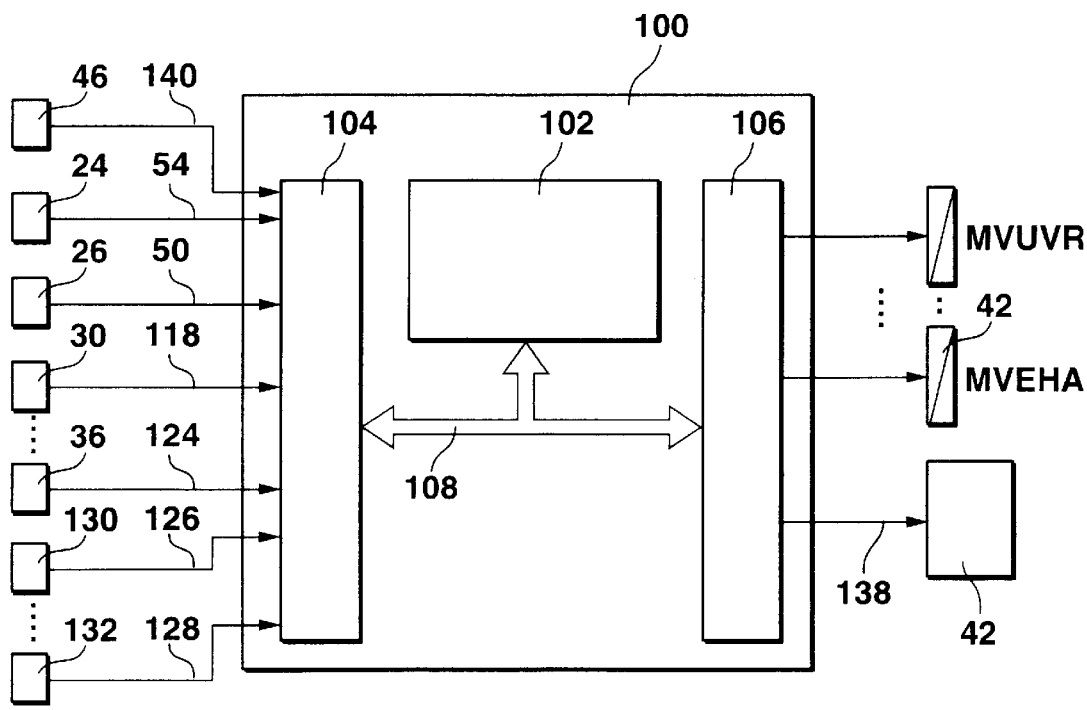
FIG. 2 shows a control unit controlling the electrohydraulic braking system.

The electrically operable valves and pump 42 are driven by at least one electronic control unit, sketched in FIG. 2. It includes at least one microcomputer 102, one input circuit 104, one output circuit 106, and a bus system 108 linking these elements for mutual data exchange. Lines 50 and 54 run from brake-pedal switch 24 and pedal-travel sensor 26 to input circuit 104. In addition, input lines 118 through 124 connect input circuit 104 to sensors 30 through 36 allocated to each wheel brake. Provision is furthermore made for an input line 140 which runs from measuring device 46 for detecting the accumulator pressure to input circuit 104. Further input lines 126 through 128 connect input circuit 104 to measuring devices 130 through 132 for detecting further operating variables of the braking system, of the vehicle and/or of its drive unit. Such operating variables are, e.g., the wheel velocities, possibly the motor torque supplied by the drive unit, axle loads, the pressure in the brake line (sensor 28), etc. A plurality of output lines are connected to output circuit 106. Shown, for example, are the output lines, via which the valves of the pressure modulators are actuated. Pump 42 is driven via a further output line 138. Control unit 100 controls the braking system as a function of the supplied signal variables, along the lines presented above.

Figure 3:
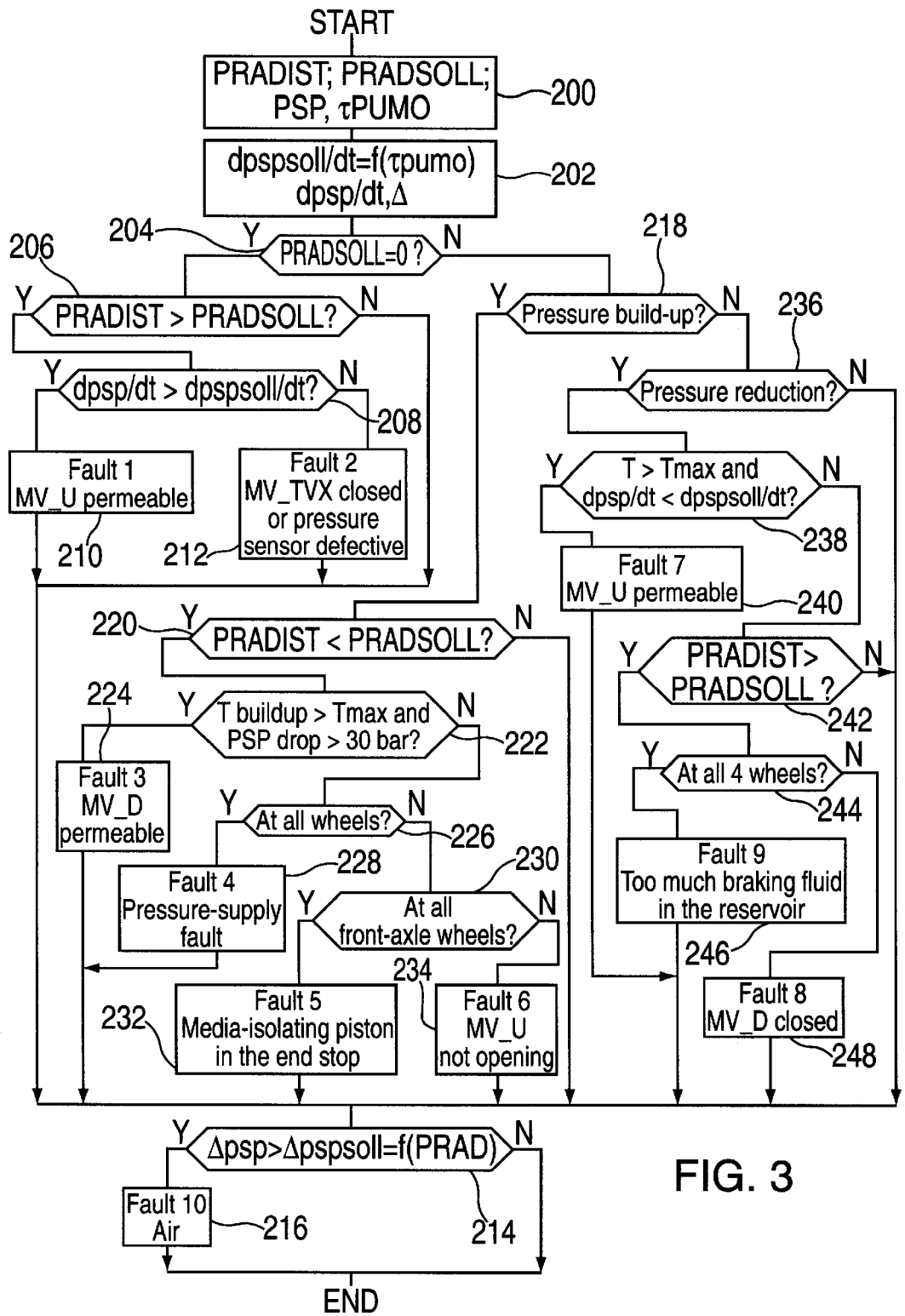
FIG. 3 shows a flow chart illustrating a preferred embodiment of the monitoring of the pressure modulation, and the selection of a suitable secondary braking operation as a microcomputer program.

FIG. 3 shows a preferred exemplary embodiment for ascertaining individual fault conditions in the area of pressure modulation, or rather of the components implementing the pressure modulation. The sketched program runs during the entire operating cycle, partly during secondary braking operation as well, at predefined points of time. The flow chart depicts the situation when monitoring one wheel brake. A corresponding program will run through for the other wheel brakes of the vehicle, or the sketched program will run through in succession for each wheel brake.

After the start of the program, the actual braking pressure PRADIST measured in the corresponding wheel brake, the setpoint pressure PRADSOLL predefined for this wheel brake, the accumulator pressure PSP, the driving pulse duty factor τPUMO of the pump motor with respect to the accumulator charge and valve currents preset by the pressure regulator are input in first step 200. Determined in the following step 202 is the permissible deviation Δ of the setpoint pressure and the actual pressure, the value of the deviation being fixed according to the dynamic response of the pressure regulator. Furthermore, in one exemplary embodiment, the setpoint pressure, the actual pressure and/or the accumulator pressure are taken into account in accordance with families of characteristics, characteristic curves, tables and/or calculation steps. In this context, the permissible deviation is greater in the case of greater actual pressures. In particular, the difference between the actual pressure and the accumulator pressure is also taken into consideration.

In addition, a setpoint gradient, i.e. a setpoint change of the accumulator pressure over time dPSPSOLL/dt is formed as a function of the pulse duty factor of the pump motor driving signal, and the accumulator pressure change over time dPSP/dt is determined on the basis of the prevailing and a previous accumulator pressure PSP. Thereupon in step 204, it is checked whether a braking action is in fact taking place or not. A check is made as to whether setpoint value PRADSOLL for this wheel is equal to zero. If this is the case, no braking process is taking place, so that according to step 206, it is checked whether the deviation between measured braking pressure PRADIST and setpoint pressure PRADSOLL is greater than the permissible deviation. In so doing, the time which the pressure regulator needs in the normal case for correcting the system deviation within the framework of the tolerance set by the permissible deviation is also taken into account, so that after the expiration of a tolerance time after the beginning of the control process, the permissible deviation must be undershot. If this is the case, i.e. if the deviation is within the permissible range, the system is functioning faultlessly, in so far as is recognizable in this state. Otherwise, it is checked in step 208 whether the change in the accumulator pressure is less than the negative setpoint value (rapid accumulator pressure drop). If this is the case, a "fault 1" is detected. This indicates an unwanted pressure rise in the corresponding wheel in the "no braking input" state, it being possible to isolate a highly permeable or open intake valve as the defective component. If the change in the accumulator pressure is not less than the negative setpoint value, a "fault 2" is assumed. This fault can have its cause in that the wheel pressure sensor is indicating an incorrect pressure, or that the brake fluid has heated and expanded in an enclosed space due to a non-opening separating valve, a non-opening temperature-compensation valve, or a clogged line with respect to the front-wheel valves, or in the case of the rear-axle brakes, due to a non-opening relief valve or balance valve, or a clogged line. In the case of hydraulic systems having currentlessly open discharge valves, the relief valves can be omitted. Then the fault representation is a non-opening discharge valve instead of a non-opening relief valve. A differentiation of these fault conditions is shown in FIG. 4 in light of the selection of the suitable secondary braking operation.

After steps 210 and 212, in the following query step 214, the change of the accumulator pressure over time ΔPSP is compared to a setpoint change ΔPSPSOLL that is a function of the wheel actual pressure. If the change is greater than the permissible change, i.e., if an accumulator pressure drop is ascertained which is too great given a specific wheel-brake pressure, "fault 10" is assumed as the fault. This points to air in one or more wheel calipers. The program is thereupon ended.

If step 204 has revealed that a braking input of the driver or of the system (e.g. FDR (Dynamic Movement Control), ASR (Traction Control), ACC (Adaptive Cruise Control)) is present (setpoint braking pressure is not zero), then in step 218, it is checked whether a pressure build-up phase exists, i.e., whether the corresponding intake valve is being driven. If this is the case, in step 220, the wheel actual pressure is compared to the setpoint pressure (see the description for step 206 as well). If the deviation of the actual pressure from the setpoint pressure is less than the permissible value, it is checked in step 222 whether the build-up time TAUFBAU has exceeded a predefined maximum time TMAX (for example, 2 seconds), and whether the accumulator pressure drop exceeds a predefined limiting value, for example, 30 bar/sec (rapid drop). If this is the case, according to step 224, "fault 3" is assumed. This means that the corresponding relief valve or discharge valve is permeable or open, or that a leakage has occurred in the area of the braking system between the accumulator and the media isolator. If one of the conditions in step 222 does not exist, according to step 226, it is checked whether the deviation between the wheel-brake pressure and the wheel setpoint pressure is less than the permissible value at all the vehicle wheels. This is effected with the aid of appropriately set marks. If this is the case, according to step 228, "fault 4" is assumed. This suggests a fault in the pressure supply. If this fault representation does not appear at all the vehicle wheels, but according to step 230, only at the front-axle wheels, then "fault 5" is assumed (step 232). This fault lies in the fact that the media-isolator pistons are situated at the end stop. If this condition also is not fulfilled, i.e., the described situation checked in step 220 is occurring at only one wheel, according to step 234, "fault 6" is assumed. This fault can lie in a non-opening intake valve, in a leakage between the media isolator and the wheel caliper, in a media isolator which is not moving, in a clogged line, in a permeable or open temperature-compensation valve, or in a defective pressure sensor.

After steps 224, 228, 232, 234, and in the event of a no response in step 220, the program continues with step 214.

If step 218 has revealed that no pressure build-up exists, in step 236, it is checked whether pressure is being reduced. This is effected with the aid of a driven discharge valve. If a pressure-reduction phase exists, in step 238, driving (e.g., triggering) time T is compared with respect to exceeding a maximum pressure-reduction driving time Tmax, e.g. 1 second, and the accumulator pressure gradient dPSP/dt is compared to the setpoint change. If the reduction time exceeds the maximum time, and if the accumulator pressure gradient falls short of the negative setpoint value (rapid reduction), "fault 7" is assumed (step 240). This indicates that the intake valve is not closing. If one of the conditions in step 238 is not met, in step 242, the wheel-brake actual pressure PRADIST and the wheel-brake setpoint pressure PRADSOLL are compared with respect to whether the deviation between the actual braking pressure and the setpoint braking pressure is greater than the permissible value (see also the description for step 206). If this is the case, and if according to step 244, this event is occurring at all four wheel, then according to step 246, "fault 9" is assumed. No pressure reduction to zero bar can take place at all four wheels, so that it must be assumed that the fluid level in the reservoir is too high, or the return line to the reservoir is clogged.

If the situation checked in step 242 is not occurring at all four wheels, according to step 248, "fault 8" is assumed. The cause of this can be a non-opening discharge valve, a hanging media isolator, a non-opening temperature-compensation valve and/or a defective pressure sensor. After step 240, 246, 248, or in case of a no response in step 242 and 236, the program continues with step 214.

Different fault representations in the area of the pressure modulations at the individual wheel brakes can be ascertained and isolated in the manner described above. Correspondingly, depending on the fault representation ascertained, a suitable secondary braking operation is selected which ensures the greatest possible availability of the electrohydraulic braking system, accompanied by sufficient performance reliability, without it being necessary to go over to the purely hydraulic secondary braking operation.

In addition to the complete switchover to a purely hydraulic operation and switching off the electronic control of the front-axle and rear-axle brakes, the following partial switch-off possibilities exist in principle. First of all, braking can be carried out with open balance valves at the front and/or rear axle. Furthermore, braking can be carried out with muscular-energy operation at one front wheel, while the remaining three vehicle wheels are braked with electronic pressure control. In addition, braking can be effected in 3-wheel EHB (Electrohydralulic Braking) operation, in that no pressure is built up at one wheel of the front axle, and the balance valve of the front axle is closed. In the preferred exemplary embodiment, braking is carried out with open balance valves at one axle when, for example, one of the two pressure sensors of one axle breaks down. This axle is then acted upon with pressure with an open balance valve, and the pressure is regulated on the basis of the remaining pressure sensor. Since a wheel-individual control is no longer possible, wheel-individual functions are switched off. The corresponding procedure has also proven to be suitable in response to a non-opening pressure-buildup valve. Braking using muscular-energy operation at one wheel, and electric control at the remaining three wheels is considered when, for example, a media isolator cannot be moved. The wheel to which this media isolator is allocated is controlled by the driver via the master cylinder; the remaining three wheels are still controlled in electrohydraulic operation. For example, a 3-wheel EHB operation is initiated when a leakage is sensed in a front-wheel brake circuit. Then the balance valve of the front axle is closed, and the corresponding wheel is no longer supplied with pressure. The currentlessly closed pressure-reduction valve of this wheel is driven briefly at regular timed intervals. To avoid a strong build-up in yawing moment, a yawing-moment attenuation, whose functioning method in principle is known from the related art, is advantageous.

Figure 4A:
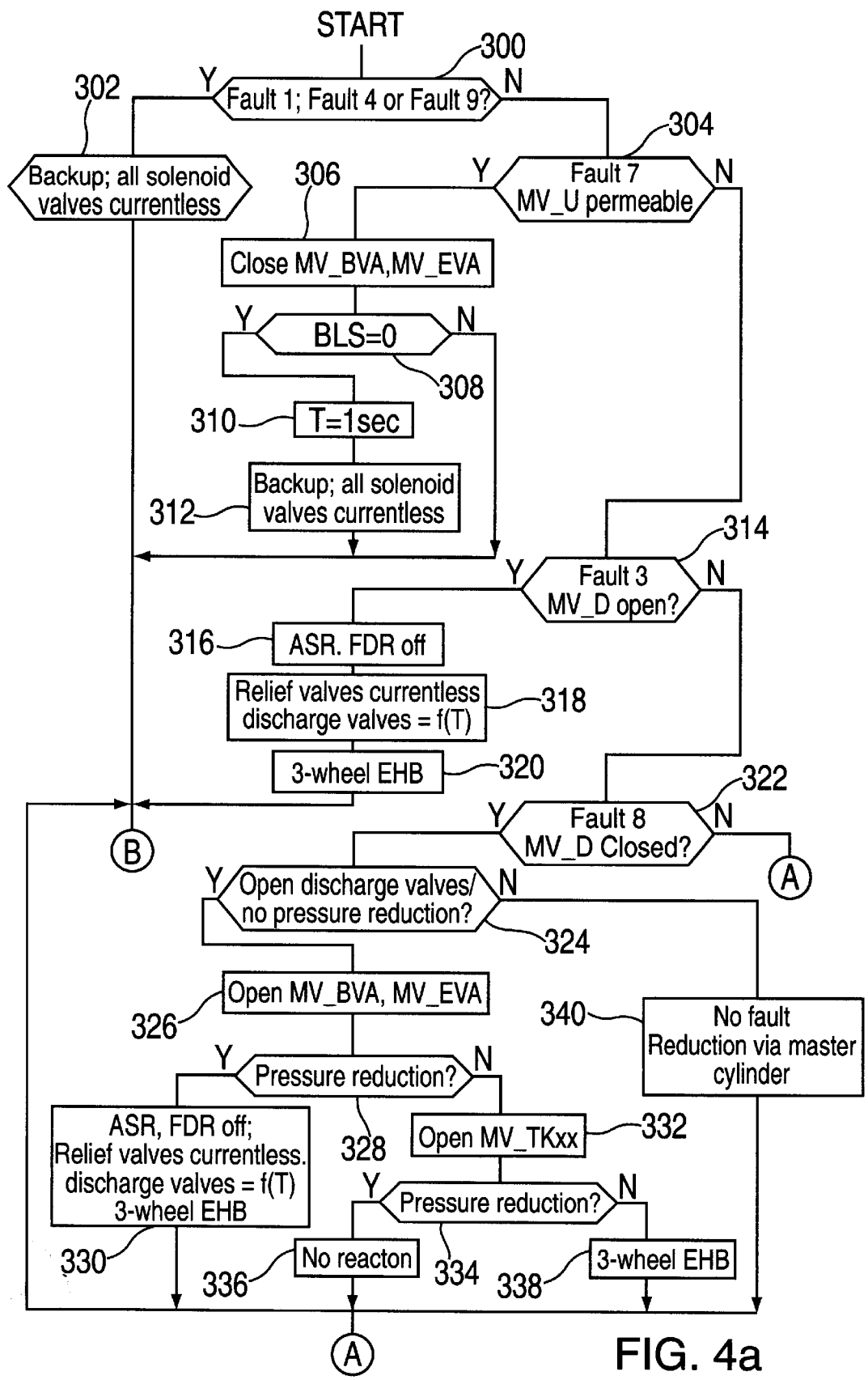
FIG. 4a shows a first portion of another flow chart illustrating a preferred embodiment of the monitoring of the pressure modulation, and the selection of a suitable secondary braking operation as a microcomputer program.
Figure 4B:
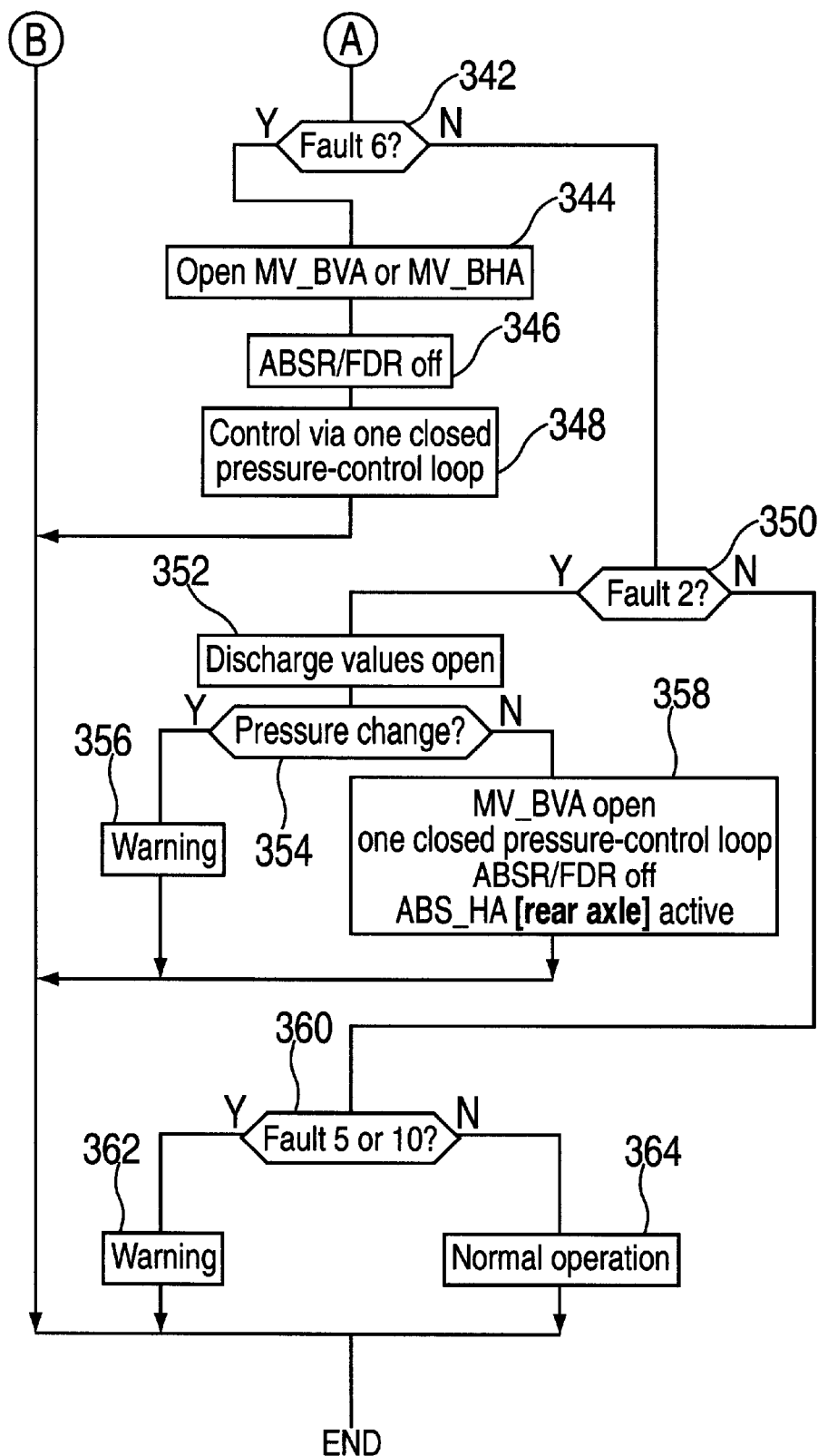

FIGS. 4a and 4b show a detailed representation of the secondary braking operations initiated as a function of the respective fault case present, with respect to a preferred exemplary embodiment. The sketched program runs during the operating cycle at predefined points of time.

In the first step 300, it is checked whether fault 1, fault 4 or fault 9 exists. If this is the case, then an electronically controlled operation is not possible. The system goes over into the completely hydraulic backup; all solenoid valves are currentless (compare representation according to FIG. 1). This is the case in the event of a permeable or open intake valve, a fault in the pressure supply or a fluid level which is too high. The program part is thereupon ended. If none of the indicated faults is present, according to step 304, it is checked whether fault 7 was detected. If this is the case, according to step 306, first of all the balance valves and possibly the relief valves are closed at the defective axle. It is then checked in step 308 whether the braking process is ended by releasing the brake pedal (BLS=0). If this is the case, according to step 310, there is a wait for a predetermined time, preferably 1 second, and thereupon in step 312, the system goes into purely hydraulic backup, in that all the solenoid valves are currentless. Thereupon the program is ended, in the same way as in the case of a continual braking process.

If fault 7 does not exist, it is checked in step 314 whether fault 3 is present. If this is the case, in step 316, the traction control and the dynamic movement control are switched off; according to step 318, the intake valve is switched over into the currentless state, and the discharge valve is driven briefly at specific timed intervals, and according to step 320, a 3-wheel EHB control is carried out, during which the remaining 3 wheel brakes are electronically controlled. The anti-lock protective function remains active. The program is thereupon ended.

If fault 3 is also not present, according to step 322, it is checked whether fault 8 was detected. If this is the case, it is checked in step 324 whether, given an open discharge valve, no pressure reduction is measurable. If this is the case, according to step 326, the corresponding balance valve, and possibly the relief valve are opened. Thereupon, in step 328, it is checked whether a pressure reduction is measurable now. If this is the case, it must be assumed that the discharge valve is not opening. In this case, according to step 330, the 3-wheel EHB operation described in steps 316 through 320 is initiated. If no pressure reduction is measurable, according to step 332, the temperature-compensation valve is opened. In the following step 334, it is checked whether a pressure reduction is now measurable. If this is the case, then an enclosed (i.e., trapped) volume, a hanging media isolator, or a non-opening relief valve can be assumed as the fault. According to step 336, no reactions are initiated, since during the next braking process, a fault is detected, in the case of which no pressure build-up is taking place in the wheel. If no pressure reduction is detected in step 334, then the known 3-wheel EHB operation is initiated in step 338. If step 324 has revealed that no pressure-reduction phase is active, i.e. a fault detection has taken place after the pressure-reduction phase, according to step 340, no fault is assumed, and the pressure is reduced via the master cylinder by opening the separating valves. After steps 330, 336 and 338 and 340, the program is ended.

If fault 8 does not exist, according to step 342, it is checked whether fault 6 is present. If this is the case, then according to step 344, the balance valve of the front axle, or that of the rear axle (depending on the location of the fault) is opened, according to step 346, the ABS (Anti-lock Braking System), the traction control and the dynamic movement control are switched off, and according to step 348, the axle is controlled via a single closed pressure-control loop. Thereupon, the program is ended.

If fault 6 also does not exist, according to step 350, it is checked whether fault 2 was detected. If this is the case, according to step 352, the discharge valves are opened, and it is checked in step 354 whether a pressure change has taken place. If this is the case, it can be assumed that an enclosed volume exists, because relief or balance valves are not open. In this case, according to step 356, only a warning is given. If no pressure change takes place, then a pressure-sensor offset fault must be assumed. Therefore, according to step 358, the balance valve is opened, and the pressure is measured via a different wheel pressure sensor. Additional functions such as ABS, ASR or FDR are switched off. After step 356 or 358, the program is ended. If fault 2 also does not exist, according to step 360, it is checked whether fault 5 or 10 is present. If this is the case, according to step 362, the driver is warned; otherwise, according to step 364, normal operation takes place.

The fault check-test shown in FIG. 3 runs through in parallel to the program according to FIGS. 4a and 4b, as long as no purely hydraulic backup is initiated.

What is claimed is:

1. A method for controlling a braking system of a motor vehicle, comprising the steps of:

converting a braking input of a driver into a setpoint pressure for each wheel brake of the motor vehicle;

adjusting a wheel-brake pressure for each wheel brake to the setpoint pressure as a function of a measured wheel-brake pressure; and initiating a secondary braking operation when a first pressure of a first wheel substantially deviates from the setpoint pressure and one of: (a) the braking input is not present and (b) a pressure build-up in the braking system is present, and wherein the secondary braking operation includes an operation which controls both the first pressure of the first wheel and a second pressure of a second wheel, situated on a same axle as the first wheel, in a single closed pressure-control loop.

2. The method according to claim 1, wherein the initiating step is performed only when the pressure build-up is present and an accumulator pressure drop does not fall below a predefined limiting value.

3. The method according to claim 1, wherein the secondary braking operation is effected by opening a balance valve allocated to the axle.

4. The method according to claim 1, further comprising the step of:

during the secondary braking operation, switching off wheel-individual functions of the axle and retaining at least an anti-lock braking function at a non-affected axle.

5. The method according to claim 1, further comprising the step of:

when the particular pressure substantially deviates from the setpoint pressure and one of (a) the braking input is not present and (b) the pressure build-up is present, driving a valve arrangement along lines of a pressure reduction at the particular wheel, wherein the secondary braking operation is initiated only if a change in wheel pressure is not present.

6. The method according to claim 1, wherein the secondary braking operation is not a purely hydraulic operation, and further comprising the step of:

when a particular fault is present and when the braking system is performing the secondary braking operation, retaining a fault detection process active.

7. A method for controlling a braking system of a motor vehicle, comprising the steps of:

converting a braking input of a driver into a setpoint pressure for each wheel brake of the motor vehicle;

adjusting a wheel-brake pressure for each wheel brake to the setpoint pressure as a function of a measured wheel-brake pressure; and initiating a secondary braking operation when a particular pressure of a particular wheel substantially deviates from the setpoint pressure and one of: (a) a pressure build-up continues longer than a predetermined time and (b) a pressure reduction is present, and wherein the secondary braking operation includes an operation which does not control the particular wheel in a closed pressure-control loop, which separates the particular wheel from a master cylinder of the braking system, and which controls other wheels of the motor vehicle.

8. The method according to claim 7, further comprising the step of:

during the secondary braking operation, switching off wheel-individual functions of a particular axle and retaining at least an anti-lock braking function at a non-affected axle.

9. The method according to claim 7, further comprising the step of:

during the secondary braking operation, driving a valve arrangement of the particular wheel as a function of time along lines of a pressure reduction.

10. The method according to claim 7, further comprising the step of:

performing a yawing-moment attenuation to avoid a predetermined build-up of a yawing moment.

11. The method according to claim 7, further comprising the step of:

switching off a traction controller and a dynamic-movement controller and retaining an anti-lock controller active.

12. The method according to claim 7, wherein the secondary braking operation is not a purely hydraulic operation, and further comprising the step of:

when a particular fault is present and when the braking system is performing the secondary braking operation, retaining a fault detection process active.

13. A method for controlling a braking system of a motor vehicle, comprising the steps of:

converting a braking input of a driver into a setpoint pressure for each wheel brake of the motor vehicle;

adjusting a wheel-brake pressure for each wheel brake to the setpoint pressure as a function of a measured wheel-brake pressure; and initiating a secondary braking operation when one of:
(i) a particular pressure of a particular wheel substantially deviates from the setpoint pressure,
an accumulator pressure drops below a predefined limiting value in response to a pressure build-up, and
one of (a) the braking input is not present and (b) the pressure build-up is present, and
(ii) the pressure reduction continues longer than a predetermined time and the accumulator pressure drops below the predefined limiting value, and wherein the secondary braking operation includes an operation which controls a valve arrangement such that the driver exercises a direct hydraulic action at least on front-axle brakes.

14. The method according to claim 13, further comprising the step of:

during the secondary braking operation, driving the valve arrangement of the particular wheel as a function of time along the lines of a pressure reduction.

15. The method according to claim 13, further comprising the step of:

performing a yawing-moment attenuation to avoid a predetermined build-up of a yawing moment.

16. The method according to claim 13, further comprising the step of:

switching off a traction controller and a dynamic-movement controller and retaining an anti-lock controller active.

17. The method according to claim 13, wherein the secondary braking operation is not a purely hydraulic operation, and further comprising the step of:

when a particular fault is present and when the braking system is performing the secondary braking operation, retaining a fault detection process active.

18. A method for controlling a braking system of a motor vehicle, comprising the steps of:

converting a braking input of a driver into a setpoint pressure for each wheel brake of the motor vehicle;

adjusting a wheel-brake pressure for each wheel brake to the setpoint pressure as a function of a measured wheel-brake pressure; and warning the driver without initiating a secondary braking operation when one of:
(a) a pressure build-up is present and a pressure for each front wheel substantially deviates from at least one setpoint pressure, and
(b) an accumulator pressure drop is greater than a limiting value, the limiting value being a function of a particular wheel pressure.

19. The method according to claim 18, wherein the secondary braking operation is not a purely hydraulic operation, and further comprising the step of:

when a particular fault is present and when the braking system is performing the secondary braking operation, retaining a fault detection process active.

20. A device for controlling a braking system of a motor vehicle, comprising:

a control unit converting a braking input of a driver of the motor vehicle into a setpoint pressure for each wheel brake of the motor vehicle, the control unit adjusting a wheel-brake pressure to the setpoint pressure as a function of a measured wheel-brake pressure, the control unit including an arrangement initiating a secondary braking operation, wherein the secondary braking operation is initiated when a first pressure of a first wheel substantially deviates from the setpoint pressure and one of (a) the braking input is not present and (b) a pressure build-up of the braking system is present, and wherein the secondary braking operation includes an operation which controls both the first pressure of the first wheel and a second pressure of a second wheel, situated on a same axle as the first wheel, in a single closed pressure-control loop.

21. A device for controlling a braking system of a motor vehicle, comprising:

a control unit converting a braking input of a driver of the motor vehicle into a setpoint pressure for each wheel brake of the motor vehicle, the control unit adjusting a wheel-brake pressure to the setpoint pressure as a function of a measured wheel-brake pressure, the control unit including an arrangement initiating a secondary braking operation, wherein the secondary braking operation is initiated when a particular pressure of a particular wheel substantially deviates from the setpoint pressure and one of (a) a pressure build-up continues longer than a predetermined time and (b) a pressure reduction is present, and wherein the secondary braking operation includes an operation which does not control the particular wheel in a closed pressure-control loop, which separates the particular wheel from a master cylinder of the braking system, and which controls other wheels of the motor vehicle.

22. A device for controlling a braking system of a motor vehicle, comprising:

a control unit converting a braking input of a driver of the motor vehicle into a setpoint pressure for each wheel brake of the motor vehicle, the control unit adjusting a wheel-brake pressure to the setpoint pressure as a function of a measured wheel-brake pressure, the control unit including an arrangement initiating a secondary braking operation, wherein the secondary braking operation is initiated when one of:
(i) a particular pressure of a particular wheel substantially deviates from the setpoint pressure,
an accumulator pressure drops below a predefined limiting value in response to a pressure build-up, and
one of (a) the braking input is not present and (b) the pressure build-up is present, and
(ii) the pressure reduction continues longer than a predetermined time and the accumulator pressure drops below the predefined limiting value, and wherein the secondary braking operation includes an operation which controls a valve arrangement such that the driver exercises a direct hydraulic action at least on front-axle brakes.

23. A device for controlling a braking system of a motor vehicle, comprising:

a control unit converting a braking input of a driver of the motor vehicle into a setpoint pressure for each wheel brake of the motor vehicle, the control unit adjusting a wheel-brake pressure to the setpoint pressure as a function of a measured wheel-brake pressure, the control unit including an arrangement which performs one of initiating a secondary braking operation and warning the driver without initiating the secondary braking operation, wherein the driver is warned without initiating the secondary braking operation when one of:
(a) a pressure build-up is present and a pressure for each front wheel substantially deviates from at least one setpoint pressure, and
(b) an accumulator pressure drop is greater than a limiting value, the limiting value being a function of a particular wheel pressure.

* * * * *